Oct. 9, 1945.   R. W. HAUTZENROEDER   2,386,459
SPEED CHANGE DEVICE
Filed April 10, 1944   3 Sheets-Sheet 1

INVENTOR.
RICHARD W. HAUTZENROEDER
BY
Oberlin, Limbach & Day
ATTORNEYS

Oct. 9, 1945.   R. W. HAUTZENROEDER   2,386,459
SPEED CHANGE DEVICE
Filed April 10, 1944   3 Sheets-Sheet 2

INVENTOR.
RICHARD W. HAUTZENROEDER
BY
Oberlin, Limbach & Day.
ATTORNEYS

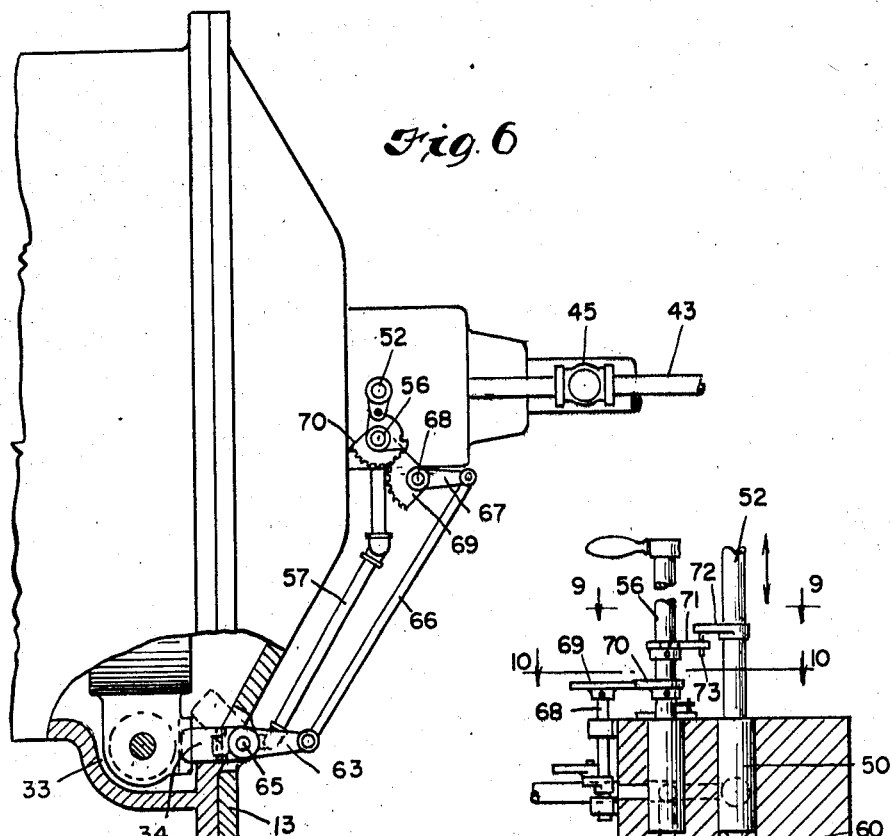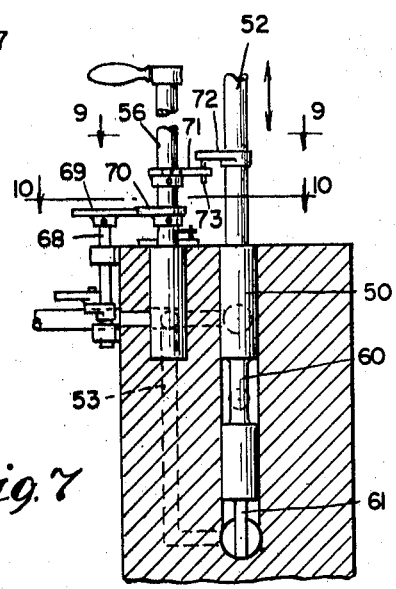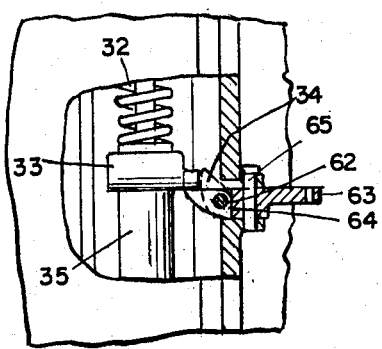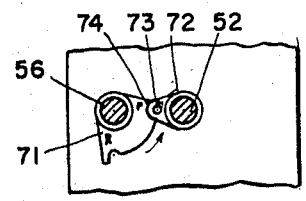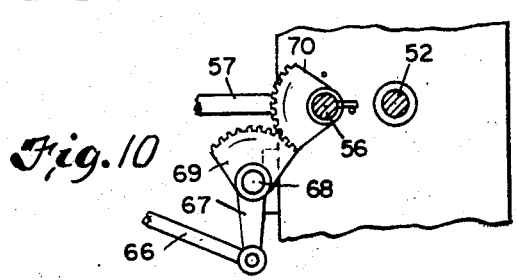

Patented Oct. 9, 1945

2,386,459

UNITED STATES PATENT OFFICE 2,386,459

SPEED CHANGE DEVICE

Richard W. Hautzenroeder, Mansfield, Ohio

Application April 10, 1944, Serial No. 530,272

8 Claims. (Cl. 192—60)

This invention relates as indicated to change speed devices and particularly to a device which is adapted to replace both the clutch and the change speed gear transmission in automotive equipment such as passenger cars, trucks, busses, tractors, rail cars, locomotives, and the like.

It is a principal object of the invention to provide an apparatus of the character described which will make possible an infinitely variable change of speed ratio in automatic response to the load reaction on the driven shaft.

It is a further object of the invention to provide a device of the character described which is of small size, occupying less space than the present-day conventional clutches alone, and a device which may be produced at relatively low cost.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 6 is a top plan view partially in section of the apparatus illustrated in Figs. 1 and 4;

Fig. 7 is a fragmentary sectional view drawn to an enlarged scale of a portion of the apparatus illustrated in Fig. 1 taken on a plane substantially indicated by the line 7—7 in Fig. 1;

Fig. 8 is a fragmentary part sectional part side elevational view of that portion of the apparatus illustrated in Fig. 6 at the lower part of said figure;

Fig. 9 is a plan view partially in section of the apparatus illustrated in Fig. 7 taken on a plane indicated by the line 9—9; and Fig. 10 is a plan view partially in section of a portion of the apparatus illustrated in Fig. 7 taken on a plane indicated by the line 10—10.

Figure 1:
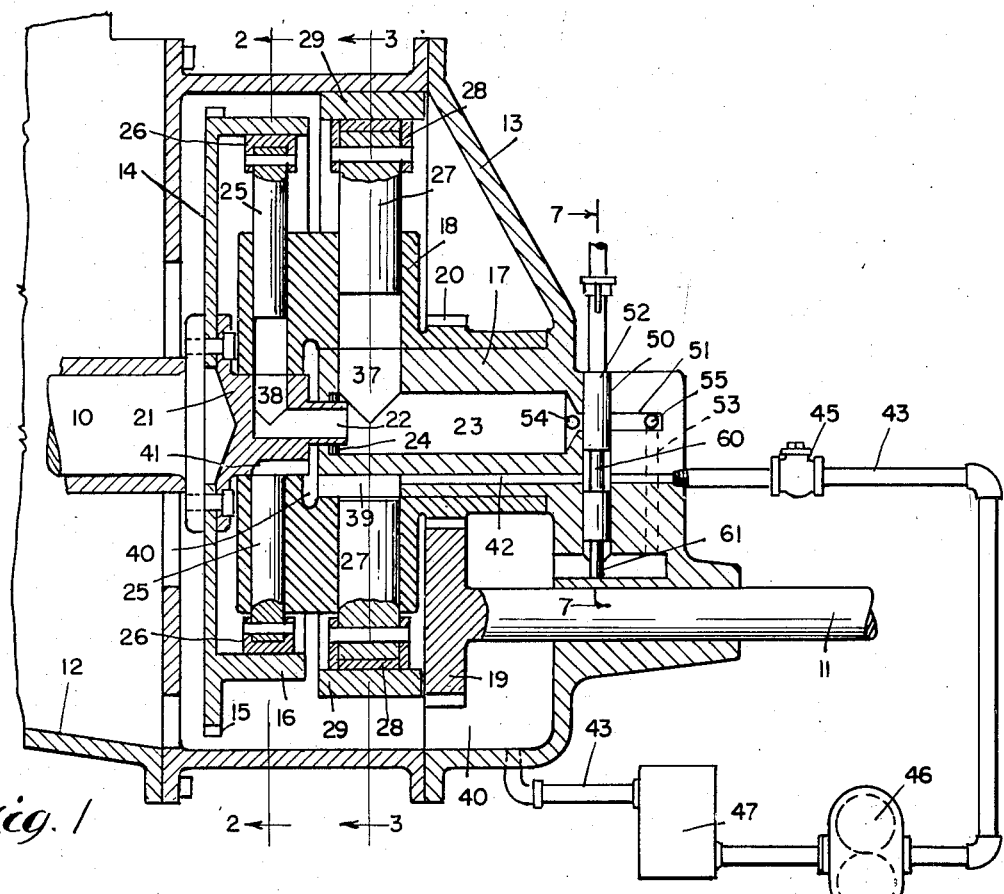
Fig. 1 is a sectional view on line 1—1 of Fig. 2 showing one embodiment of the principal features of the present invention.
Figure 2:
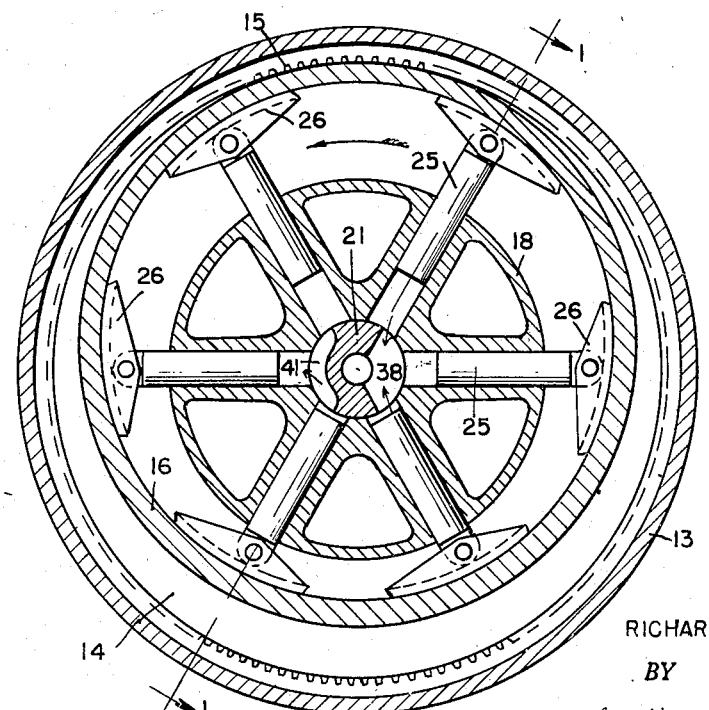
Fig. 2 is a transverse sectional view of the apparatus illustrated in Fig. 1 taken on a plane substantially indicated by the line 2—2.
Figure 3:
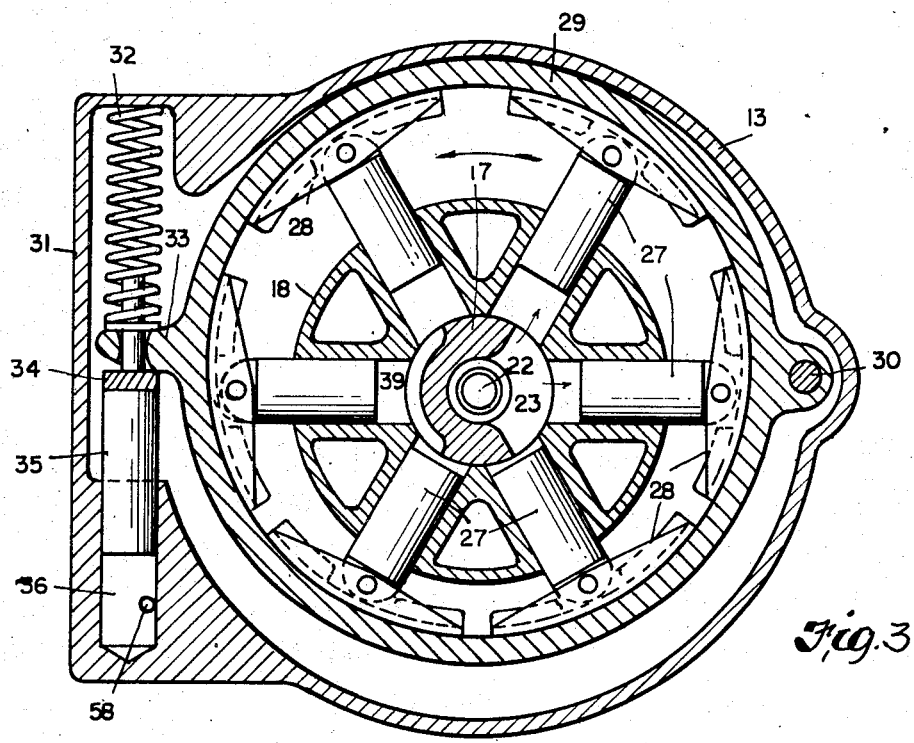
Fig. 3 is a transverse sectional view of the apparatus illustrated in Fig. 1 taken on a plane substantially indicated by the line 3—3.
Figure 4:
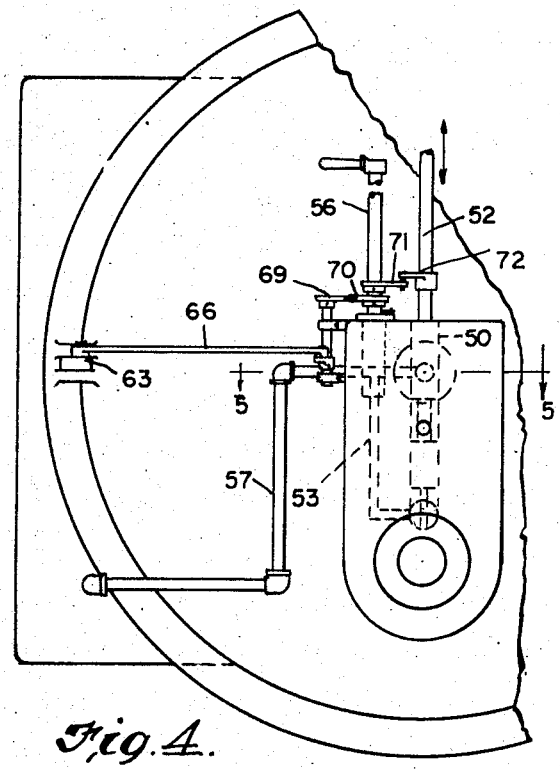
Fig. 4 is an end elevational view taken from the right-hand end of the apparatus illustrated in Fig. 1.

Referring now more specifically to the drawings and more especially to Figs. 1, 2 and 3, the illustrated embodiment of one form of my invention comprises a driving shaft 10 and a driven shaft 11. The driving shaft may be the end of the crank-shaft of an internal combustion engine or other prime mover or it may be the output shaft of any speed change device driven by such prime mover. If the shaft 10 comprises the end of the crank-shaft of an internal combustion engine, then it may be enclosed in the crank-case housing 12 which is provided with an extended housing 13 within which the major portion of the apparatus of my invention is contained. The extended housing 13 may conveniently be the lowest point of the crank-case housing so that its lower portion constitutes a sump within which is collected the lubricating oil ordinarily contained in crank-cases.

Secured as by bolts or otherwise to the driving shaft 10 is a flywheel 14, on the periphery of which may be formed teeth 15 for engagement by the pinion of conventional starter apparatus not shown. Mounted on the flywheel, or preferably formed integral with, as illustrated in the drawings, is an annulus 16, the center of which is eccentric with respect to the axis of the shaft 10.

The extended housing 13 carries a stationary cylindrical extension 17 which is preferably coaxial with the shaft 10. Rotatably supported on the extension 17 is a rotor 18 which may be coupled to the drive shaft 11, in any suitable fashion as by means of a pinion 19 and a gear 20 formed on the rotor.

A valve member 21 is secured to the flywheel 14 and is provided with a tubular extension 22 which extends into a cylindrical opening 23 formed axially of the projection 17. A bushing such as 24 is provided for the purpose of providing a fluid-tight seal between the tubular extension 22 and the projection 17.

The rotor 18 is provided with a series of radially extending pump jacks 25 which, at their outer ends, are provided with shoes 26 adapted to engage the inner periphery of the annulus 16. The rotor 18 also carries a series of circumferentially spaced radially extending motor jacks 27 which, on their outer ends, are provided as illustrated in Fig. 3 with contact shoes 28 adapted to engage the inner periphery of a second annulus 29. The annulus 29 is pivotally supported on a pin 30 so that it may be moved from the position illustrated in Fig. 3, which, throughout the description and in the claims, will be referred to as the position of maximum positive eccentricity, to a corresponding position in the lower portion of the housing extension 13, which latter position will be referred to in the specification and claims as the position of maximum negative eccentricity.

An extension 31 in the side of the housing carries a spring 32 which, at its opposite end, bears on such housing and on an extension 33 of the annulus 29. The spring 32 would normally maintain the annulus 29 in the position of its maximum negative eccentricity, excepting that a latch 34 is provided, which in the manner hereinafter more fully explained arrests the annulus 29 under the influence of the spring 32, maintaining the same in substantial concentricity with the axis of the projection 17 and the shaft 10.

A hydraulic jack 35 is provided which, when fluid under pressure is admitted to the cavity 36, will be forced upwardly compressing the spring 32 to move the annulus 29 toward its position of maximum positive eccentricity, depending upon the relative values of the pressure within the cavity 36 and the strength of the spring 32.

The passage or cavity 23 in the projection 17 is provided with a radially extending opening 37 by which the cavity 23 may be placed in communication with the space beneath the motor jacks 27 as the rotor 18 rotates. A similar opening 38 extends radially outwardly through the valve member 21 and by which its central cavity 22 may be placed into communication with the several pumping jacks 25 as relative rotation occurs between the rotor 18 and the valve member 21.

The projection 17 is provided with a relieved area 39 of limited circumferential extent which is in communication with a relieved area 40 formed in the rotor 18 adjacent the end of the projection 17. The valve member 21 is similarly provided with a relieved area 41 of limited circumferential extent and by which selected ones of the pumping jacks 25 may be placed in communication with the cavity 40 and in turn with the cavity 39.

From the foregoing, it will be observed that as relative rotation occurs between the rotor and the valve member 21 and the projection 17, the pumping piston 25, shown in the upper position in Fig. 1, will be placed in communication with the next adjacent motor piston 27 and the pumping piston 25, in the lower position in said figure, will be placed in communication with the corresponding lower motor piston 27.

For convenience in identification in the following description and in the claims, the cavity including the spaces 37, 38 and 23 will be referred to as the pressure passage, while the passage defined by spaces 39, 40 and 41 will be referred to as the unloading passage.

Leading to the unloading passage 39 is a passage 42 to which is connected a conduit 43 which leads to the bottom of the sump 40 in the lower portion of the housing extension 13. The conduit 43 has in series therein a check valve 45, a pressure pump 46 and a filter 47. At this point, it may be noted that the pump 46 may be the pressure pump which supplies the lubricating oil to the entire engine, or it may be an auxiliary pump driven from any suitable source and adapted merely for the purpose of serving the apparatus which comprises my invention.

A cross-bore 50 interconnects the reduced extension 51 of the cavity 23, the passage 42, and the sump 44. Movably positioned in the cross-bore 50 is a valve 52, the construction and mode of operation of which will be described at a later point. The extension 51 of the passage 23 is connected to the sump by means of a second cross-passage 53.

Figure 5:
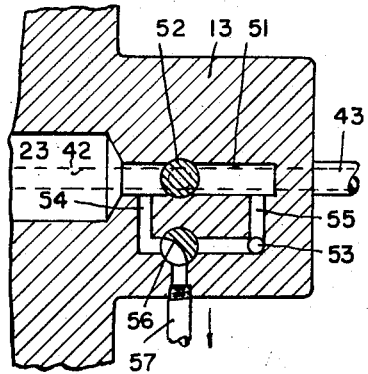
Fig. 5 is a fragmentary sectional view of a portion of the apparatus illustrated in Fig. 4 taken on a plane indicated by the line 5—5.

As most clearly illustrated illustrated in Fig. 5, the extension 51 of the cavity 23, has leading therefrom, on opposite sides of the valve 52, passages 54 and 55 which lead to a valve 56 in Fig. 5 by which they may be selectively placed in communication with a conduit 57 which leads to the space 36 through the opening 58.

When the valve 56 is in the position illustrated in Fig. 5, then the pressure passage 23 will be in communication with the space 36 (see Fig. 3) below the jack 35. When the valve 56 is rotated for approximately 90° in a counter-clockwise direction, it will seal the pressure passage 54 and vent conduit 57 to the sump 44 through the vertical passage 53.

It will be observed that the valve 52 is provided with a cylindrical body which has a very close sliding fit in the cylindrical opening 59 within which the valve moves. In a local area at 60 the cylindrical body of the valve 52 is provided with a reduced cross-section and the terminal portion 61 of the body is also reduced to serve as a stop by striking the lower portion of the casing extension 13 when the valve is in the position illustrated in Fig. 1.

When valve 52 is in the position illustrated in Fig. 1, it seals the direct passage from the pressure passage 23 to the passage 51 and leaves open the passage 42. When, however, the valve 52 is raised for any substantial distance, the lower enlarged portion of the valve will seal the passage 42 and the relieved portion 60 of the valve will open a direct passage from the pressure passage 23 to the passage 51.

As most clearly illustrated in Figs. 6 and 8, the latch 34 is pivotally mounted on a pin 62 on the end of a lever arm 63. The latch 34 is provided with a shoulder 64 which prevents the counter-clockwise rotation of the latch but permits clockwise rotation thereof as viewed in Fig. 8. The arm 63 is pivotally supported on a pin 65 so that upon clockwise rotation, as viewed in Fig. 6, of the arm 63, the latch 34 is swung to the dotted-line position shown in Fig. 6 so as not to interfere with the vertical reciprocation of the jack 35, the spring 32, and the associated projection 33 on the annulus 29.

Such pivotal movement of the arm 63 is achieved by means of a link 66 connected at one end to the arm 63 and at its other end to an arm 67 which is keyed to a shaft 68. The shaft 68, at its upper end carries a gear segment 69 which meshes with a similar segment 70 carried by the valve 56.

In the operation of the apparatus in the manner hereinafter more particularly explained, it becomes desirable to insure that the valve 56 will not be rotated from one position to the other while the valve 52 is in its lower-most position, that is, the valve 56 should not be rotated from one position to the other unless the valve 52 is in such a position as to seal the passage 42 and to open the passage from the pressure passage 23 to the passage 51. This is achieved by providing on the stem of the valve 56 a segment 71 secured thereto and a segment 72 on the stem of the shaft 52. The segment 72 carries a pin 73 which is adapted to closely engaged notches such as 74 formed in the segment 71. When the pin 73 is in either of the notches 74, then the shaft 56 may not be rotated. When, however, the valve 52 is raised so that the pin 73 clears the segment 71, the valve 56 may be rotated. However, the valve stem 52 may not be lowered to the position illustrated in full lines in Figs. 1 and 7, unless the rotated position of the valve 56 is such as to permit the pin 73 to drop into either of the notches 74.

As the valve 56 is rotated, it will effect a rotation through the gear segments 69 and 70 of the shaft 68, which through levers 63, 66 and 67 will cause a corresponding rotation of the latch 34 into and out of blocking position with respect to the projection 33 on the annulus 29.

Before proceeding with a description of the operation of the apparatus, it may be well to point out that relative rotation between the eccentric 16 and the rotor 18 will result in reciprocation of the pump jacks 25, and since the supply side 41 of such pumps is adapted to be placed in communication with the supply of fluid delivered from the pump 46, the jacks 25 will deliver fluid under pressure to the motor jacks 27.

When the annulus 29 is concentric with the axis of the rotor 18, the motor jacks will be unable to function so as to transmit any driving torque to the rotor. However, when the annulus 29 is eccentric in the direction illustrated in Fig. 3, that is, positively eccentric, the jack in the five o'clock position illustrated in Fig. 3 when energized will, by virtue of the contact of its shoe 28 with the inside of the annulus 29, cause the rotor 18 to move in a counter-clockwise direction until such jack arrives at substantially the twelve o'clock position. As soon as the jack moves past the twelve o'clock position toward the eleven o'clock position, it is then placed in communication with the unloading cavity 39, and the fluid discharged during the subsequent movement of such jack to the seven o'clock position moves through the passages 39, 40 and 41 causing the associated pump jacks 25 to move outwardly and be maintained in contact with the inner periphery of the annulus 16 until such pump jacks then reach the position of being placed in communication with the passage 38, whereupon, the cycle of operation just described will be repeated.

Mode of operation

In beginning the description of the mode of operation of the device let us assume that the rotor 18 is stationary, the valve 52 is in the elevated position and the shaft 10 is rotating, causing a consequent rotation of the flywheel 14 and the annulus 16 in the direction indicated by the arrow in Fig. 2.

After the first revolution of the annulus 16, all of the pump jacks 25 will be moved to and retained in their innermost position since the fluid under such jacks has been displaced to the sump by being forced through the passages 38, 23, 51, 55 and 53. No pressure is built up in the cavity 23, nor in the passage 37 so that no power is transmitted from the driving shaft 10 to the driven shaft 11.

Since there is no pressure within the chamber 23, no pressure will be built up in the chamber 36 in Fig. 3, and accordingly the annulus 29 will be held by the spring 32 against the stop 34 so that such annulus is substantially concentric with the axis of the rotor 18.

The rotor 18 being connected to the load is stationary. Since the control valve 52 is in the upper position, the output side of the pumping jacks 25 and the input side of the motor jacks 27 are vented to the sump. The supply of fluid from the pump 46 is shut off. Let it now be assumed that it is desired to establish driving communication between the driving shaft 10 and the driven shaft 11. The control valve 52 is moved to the position shown in full lines in Fig. 1, and in this position, it first seals off the passage 23 from communicating with the sump 44, i. e., it seals off the passage 51. Secondly, the valve 52 opens the passage from the conduit 43 to the conduit 42, thus connecting the source of fluid pressure delivered by the pump 46 to the input side of the jacks 25 through the passages 39, 40 and 41, causing each of such jacks, as they move into register with the passage 41, to be forced outwardly into engagement with the inner periphery of the annulus 16.

This outward displacement of the pump jacks 25 will be progressive. The rate of fluid input through the passage 42 is restricted. Accordingly, during the interval a pump jack 25 is in communication with the passage 41 during the first rotation of the flywheel 14 after the valve 52 is lowered, not enough fluid will be admitted to such jack to cause it to move to the extreme position permissible by the eccentricity of the annulus 16. Depending upon the rate at which fluid is admitted through the passage 42 will determine the number of revolutions of the flywheel 14 before the inside of the system is completely filled with fluid.

The "harshness" or "softness" of the clutching action of the apparatus may, therefore, be determined by regulating the rate of flow through the passage 42. This may be accomplished either by the size of the passage itself, as originally constructed, or by a suitable valve in such passage. It may be pointed out that during the normal operation of the apparatus, the only fluid required to be supplied through the passage 42 is that amount which is lost by leakage through the various sliding fits and such replenishing rate will generally be less than the rate of flow during the starting period required for even the softest clutching action.

As the pump jacks 25 are thus successively and progressively energized by being gradually filled with fluid, they, in turn, progressively and successively energize the motor jacks 27 to transmit through them to the rotor 18 the starting torque which is transmitted to the driven shaft 11. Before, however, there can be any substantial pressure built up in the chamber 23, the pressure in such chamber is transmitted to the cavity 36, and as soon as the pressure builds up in such latter cavity, it will raise the piston 35 against the action of the spring 32.

Stated in another way, it will be observed that the spring 32 holds the annulus 29 concentric with the rotor 18 so long as there is no pressure in the chamber 36. With the annulus 29 in such concentric position, there can be no working displacement of the motor pistons 27, and the fluid, therefore, delivered by the pumping pistons 25 builds up pressure in the chamber 23 until the translated pressure in the chamber 36 moves the annulus 29 to an eccentric position, permitting such pressure to operate through the motor jacks and transmit a driving torque through the rotor 18 to the driven shaft 11.

When the annulus 29 is in its position of maximum positive eccentricity as illustrated in Fig. 3, the rotor 18 will be running at a speed which is determined by the relative displacements of the pump and motor jacks (25 and 27 respectively) plus one revolution of the driving annulus 16, due to the fact that rotation of the rotor 18 and the driving annulus 16 are in the same direction. This position corresponds to the lowest gear of the conventional gear transmission. The load on the driven shaft 11 is now moving at an accelerating rate. As the load is thus accelerated, the reaction normally decreases and the pressure, on the fluid, coupling the pump and motor jacks required to maintain such acceleration, reduces proportionately.

Reduction of the load reaction on the shaft 11, and consequently the rotor 18, and a consequent reduction of the internal pressure, as for example, in the cavity 23 which is translated to the cavity 36, permits the spring 32 to move the annulus 29 towards the position of concentricity with the rotor 18, thus progressively decreasing the displacement of the motor jacks 27. This progressively decreases the overall reduction ratio until the reaction of the load is less than a predetermined portion of the maximum torque output of the prime mover coupled to the driving shaft 10 at which time the annulus 29 is arrested in the position of substantial zero eccentricity by being forced against the latch 34 by means of the spring 32.

When the annulus 29 is concentric with the rotor, the motor pistons 27 are permitted no working displacement, even though the rotor 18 is rotating, and accordingly the pumping pistons 25 can have no displacement because of the fluid trapped in the space between them and the motor pistons, and accordingly the pumping pistons 25 are locked to the flywheel and rotate in unison therewith. This corresponds to the direct drive or high gear in a conventional gear transmission. The device will remain locked in this direct drive unless or until the load reactions on the driven shaft 11 become greater than a predetermined value, which value is determined by the strength of the spring and the relative sizes of its associated piston and the pressures, at which time the jack 35 will move the annulus 29 to a position sufficiently eccentric of the rotor 18 to carry the load at this predetermined pressure.

*To declutch or disengage the device*

The control valve 52 is first moved to the disengaged or upper position above that shown in Fig. 1 and in so moving, it first closes the supply conduit 42 so that there can be no replacement from the sump of the fluid in the interior of the device. The control valve next vents the discharge side of the pump, i. e. by unblocking the passage from cavity 23 to passage 51, permitting the fluid in the cavity 23 to be vented directly to the sump so that the pressure in such cavity is reduced to substantially zero.

This reduction of the pressure correspondingly reduces the pressure in the cavity 36, permitting the spring 32 to move the annulus 29 into the position of substantial concentricity. Because the supply of their fluid is cut off, the pumping pistons 25 will all be moved to and remain in their innermost positions by the eccentricity of the annulus 16, and accordingly the device is completely disengaged and there is no driving communication between shafts 10 and 11.

*To reverse*

The reverse valve 56 is interlocked as previously explained with the control valve 52 so that the former may not be moved excepting when the control valve is in the upper or disengaged or declutching position. The reverse valve 56 in the position illustrated in Fig. 5 is in the forward position. To move it to the reverse position, it is rotated sufficiently so as to block communication between passage 54 and conduit 57, but so as to place conduit 57 in communication with conduit 53. This accordingly prevents the fluid under pressure in the cavity 23 from reaching the jack 35 and at the same time vents the cavity 36 under such jack to the sump 44. As the valve 56 is rotated from the full-line position illustrated in Fig. 5 to the reverse position last described, it will simultaneously, through the medium of the gear segments 69 and 70 and the associated linkage, swing the latch 34 clockwise as viewed in Fig. 6 for a distance sufficient to permit the spring 32 to move the annulus 29 about its pivot 30 to the lowest possible position as viewed in Fig. 3, i. e. to the position of maximum negative eccentricity.

After the reverse valve has been moved to the reverse position, aligning the notch marked R in Fig. 9 with the pin 73 on the control valve 52, the latter may then be moved to the lower or full-line position as illustrated in Figs. 1 and 7, thus placing the pump 46 in communication with the spaces 39, 40 and 41. Since fluid under pressure is now supplied to the intake side of the pumping pistons 25, the pumping action is resumed similarly to the manner in which it was explained in connection with the forward drive.

The pumping pistons gradually build up pressure and transmit the same to the motor pistons 27 which, however, because of the fact that the annulus 29 is in its position of maximum negative eccentricity, will cause a clockwise or reverse rotation of the rotor 18 as viewed in Fig. 3. The speed of the rotor 18 is now determined by the relative displacements of the pump and motor pistons, less one revolution of the annulus 16, due to the fact that rotation of the rotor 18 is in a direction opposite to the direction of rotation of the annulus 16.

The action in the reverse direction as just explained does not provide a variable change speed arrangement, due to the fact that the jack 35 has been rendered inoperative and the reduction ratio between the drive shaft 10 and the driven shaft 11 accordingly remains at its designed value.

*Return to "forward" drive*

In returning from the reverse position just described to the ahead position, the valve 52 is raised, declutching the device in the manner previously explained, clearing the pin 73 out of the R notch on the segment 71, whereupon the valve 56 may be rotated until the pin 74 is in alignment with the F or forward notch. This rotation of the valve 56 moves the latch 34 back into position so that it may engage under the projection 33 on the annulus 29. The control valve 52 may then be lowered again resulting in a resumption of pressure within the chamber 23, which immediately builds up the pressure in the cavity 36 causing the jack 35 to move the annulus 29 from its position of maximum negative eccentricity to a position of maximum positive eccentricity, whereupon, forward driving communication will be established in the manner previously explained.

*Braking or decelerating*

The device maintains driving communication in either direction between the two shafts 10 and 11 so long as the control valve 52 remains in the engaged or lower position. For braking purposes, the control valve may, therefore, be used similarly to a clutch in a conventional type of structure, and the reverse valve 56 may be used as an ahead or reverse gear with speed ratio and torque multiplication being fully automatic. For certain applications, a manual control for the position of the annulus 29 may be substituted for the automatic load responsive device which includes the spring 32 and the jack 35. Alternatively, my invention may be employed in overriding connection with such manual control so that either type of control may be employed.

It will be noted that in normal forward or ahead operation, the frictional resistance between the shoes 26 and the annulus 16 is transferred directly to the rotor and is, therefore, not lost except in so far as heat may be generated due to frictional resistance between the parts.

For certain types of automotive equipment with which my invention will be found useful, as for example on tractors and the like, it is many times desirable to provide a constant governed speed power take-off shaft, the speed of which is not variable in accordance with the ground speed of the vehicle. Such power take-off is especially useful where it is desired to drive attachments such as combines or harvesting machines, or other tools. In structures incorporating my invention, this can be conveniently accomplished in a number of ways, as for example, by direct attachment ahead of the device to the shaft 10 through the medium of suitable gearing, or, by slightly laterally off-setting the valve 52 and its associated passages, a power take-off shaft may be brought into the rear end of the housing extension 13 and directly attached to the end of the member 21, the only requirement being that such attachment not interfere with the passages such as 22, and that there be an appropriate fluid seal at the point where such power take-off shaft passes through the gear housing.

It should be noted that it is within the contemplation of my invention to so arrange the position of the latch 34 that it will arrest the annulus 29 in a position of slight negative eccentricity when the spring 32 forces the projection 33 against the stop 34. Such slight eccentricity will result in a slight overdrive although with some loss of efficiency in such overdrive range.

For many uses of devices of this character, it is desirable to have the speed ratios capable of selection under manual control of the operator and without having such speed ratios determined automatically by the operation of the device. This can be accomplished by replacing the spring 32 by means of a double-acting hydraulic jack controlled by suitable valve means, whereby the projection 33 may be held in any selected position of positive or negative eccentricity. When such manual control is employed, it becomes possible to arrest the annulus 29 at any position of either positive or negative eccentricity, thus making possible various speed ratios in both the reverse as well as forward direction.

When the device, as illustrated in Fig. 3, is employed, i. e., for full automatic torque responsive speed changes, it may be found necessary or desirable to provide some means for dampening the action of the spring 32 so as to prevent the occurrence of any oscillations which might occur.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a torque converter of the character described, a rotor carrying a series of pumping pistons and a series of motor pistons for rotation in unison, a stationary valve member within said rotor controlling the flow of fluid to said motor pistons, an annulus arranged eccentrically of said rotor and embracing the outer ends of said pump-ing pistons, a pump valve concentric with said rotor and adapted to be driven in unison with said annulus, and a control ring embracing the outer ends of said motor pistons and movable into various positions of various degrees of concentricity and eccentricity with said rotor to thus vary the displacement of said motor pistons for each rotation of said rotor, and accordingly varying the speed of the rotor relative to said first named eccentric.

2. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, means adapted to deliver fluid under pressure to said unloading passage, second valve means arranged to selectively maintain closed said pressure passage, and said unloading passage in communication with said pressure supply or alternatively to vent said pressure passage and block the pressure supply to said unloading passage.

3. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, means adapted to deliver fluid under pressure to said unloading passage, second valve means arranged to selectively maintain closed said pressure passage, and said unloading passage in communication with said pressure supply or alternatively to vent said pressure passage and block the pressure supply to said unloading passage, and means for adjustably regulating the degree of eccentricity of said second annulus with respect to the axis of said rotatable member.

4. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, means adapted to deliver fluid under pressure to said unloading passage, second valve means arranged to selectively maintain closed said pressure passage, and said unloading passage in communication with said pressure supply or alternatively to vent said pressure passage and block the pressure supply to said unloading passage, and means for adjustably regulating the degree of positive and negative eccentricity of said second annulus with respect to the axis of said rotatable member.

5. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, means adapted to deliver fluid under pressure to said unloading passage, second valve means arranged to selectively maintain closed said pressure passage, and said unloading passage in communication with said pressure supply or alternatively to vent said pressure passage and block the pressure supply to said unloading passage, and means functionally responsive to the fluid pressure within said pressure passage for adjustably regulating the degree of eccentricity of said second annulus with respect to the axis of said rotatable member.

6. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, means adapted to deliver fluid under pressure to said unloading passage, second valve means operable to selectively maintain closed said pressure passage, and said unloading passage in communication with pressure supply or alternatively to vent said pressure passage and block the delivery of said pressure supply to said unloading passage, and means functionally responsive to the fluid pressure within said pressure passage for adjustably regulating the degree of positive and negative eccentricity of said second annulus with respect to the axis of said rotatable member.

7. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, a sump, a pump adapted to deliver fluid under pressure from said sump, second valve means manually operable to selectively maintain closed said pressure passage and said unloading passage in communication with said pump or alternatively to vent said pressure passage to said sump and block the delivery of said pump to said unloading passage, and means functionally responsive to the fluid pressure within said pressure passage for adjustably regulating the degree of positive and negative eccentricity of said second annulus with respect to the axis of said rotatable member.

8. In a device of the character described, the combination with a drive shaft and a driven shaft, a rotatable member mechanically coupled to said driven shaft, a plurality of axially spaced series of radially extending fluid pressure jacks carried by said rotatable member, a first annulus driven by said drive shaft, arranged to embrace the ends of one of said series of jacks and rotated eccentrically with respect to the axis of said rotatable member, a second annulus arranged to embrace the ends of another series of said jacks, first valve means adapted upon rotation of said rotatable member to provide pressure and unloading passages respectively between circumferentially progressive groups of jacks of each of said series, a sump, a pump adapted to deliver fluid under pressure from said sump, second valve means manually operable to selectively maintain closed said pressure passage and said unloading passage in communication with said pump or alternatively to vent said pressure passage to said sump and block the delivery of said pump to said unloading passage, and means functionally responsive to the fluid pressure within said pressure passage for adjustably regulating the degree of positive and negative eccentricity of said second annulus with respect to the axis of said rotatable member, said last named means comprising a yieldable means urging said annulus to a position of maximum negative eccentricity, a fluid jack, responsive to pressure in said pressure passage, urging said annulus towards a position of positive eccentricity and a latch adapted to arrest at substantial concentricity the movement of said second annulus under the influence of said yieldable means.

RICHARD W. HAUTZENROEDER.